April 26, 1949.　　　　　J. SALAT　　　　　2,468,604
COLLAPSIBLE CARRIER ADAPTED
TO BE WHEELED TO MARKET
Filed Jan. 22, 1948　　　　　　　　　　　2 Sheets-Sheet 1
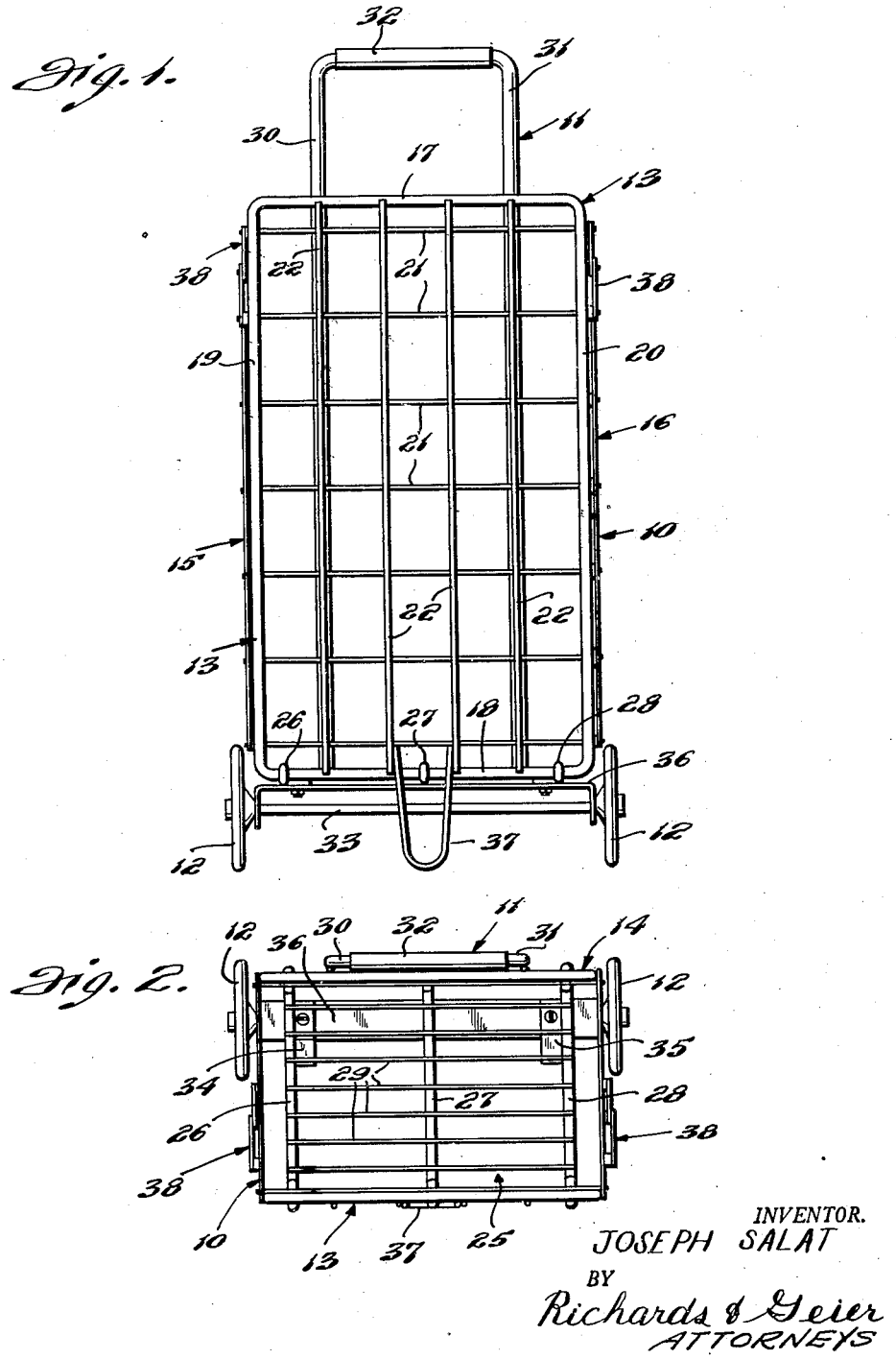
INVENTOR.
JOSEPH SALAT
BY
Richards & Geier
ATTORNEYS

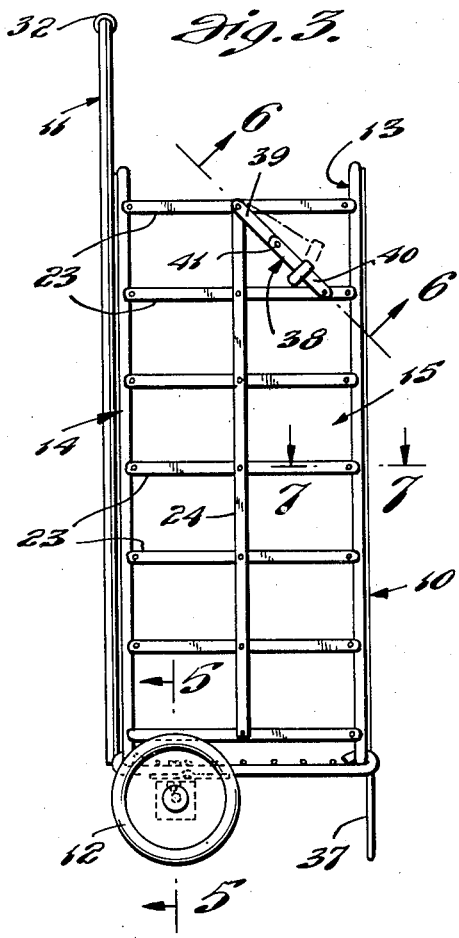
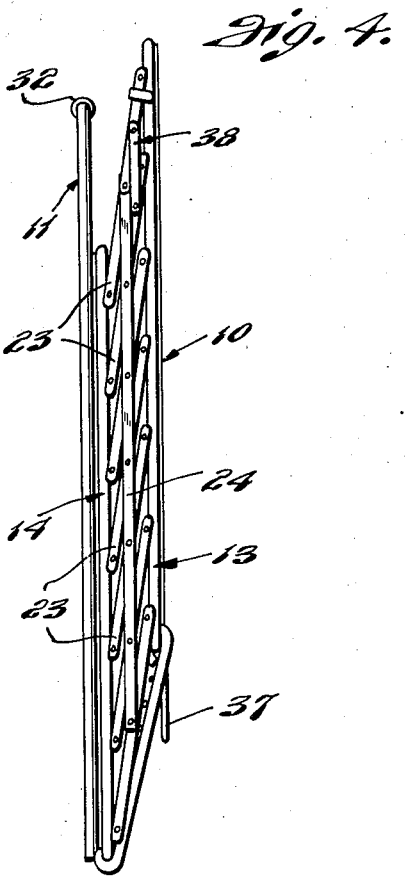
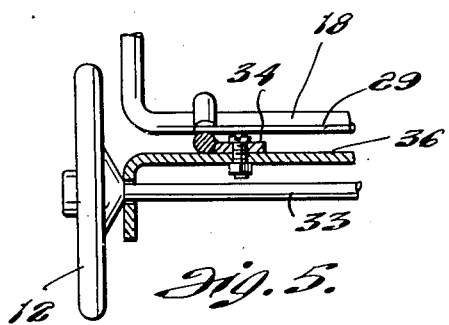
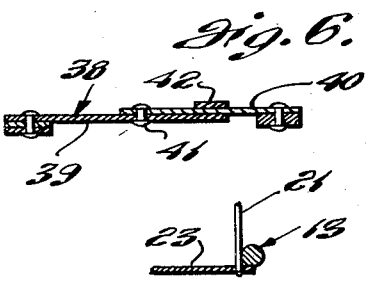
INVENTOR.
JOSEPH SALAT
BY
Richards & Geier
ATTORNEYS Patented Apr. 26, 1949

2,468,604

UNITED STATES PATENT OFFICE 2,468,604

COLLAPSIBLE CARRIER ADAPTED TO BE WHEELED TO MARKET

Joseph Salat, New York, N. Y.

Application January 22, 1948, Serial No. 3,808

3 Claims. (Cl. 280—36)

1

This invention relates to improvements in carriers adapted to be wheeled to and from markets and the like.

It is an object of the instant invention to provide a sturdy carrier that requires relatively small storage space.

A further object is to so form the carrier that relatively bulky and heavy loads are transported with ease.

Still another object is to provide a carrier that can be shipped knocked down in a comparatively small space and then readily assembled at another point.

Other objects of the present invention will become apparent in the course of the following specification.

In the attainment of these objectives, the carrier comprises a container having an open top and partially supported when being wheeled upon a handle member and against which the container is collapsible. At the back of the base of the collapsible container are rotatably mounted wheels readily attached to or removed therefrom. At the base of the front of the collapsible container is a downwardly extended support so designed that when the container is in the uncollapsed position, the support co-acting with the wheels will maintain the container substantially upright even if unattended. A latch between horizontal pivotally mounted horizontal members forming the opposed ends of the container prevents accidental closing in the open position or excessive opening.

The invention will appear more clearly from the following detailed description when taken in connection with the accompanying drawings showing by way of example a preferred embodiment of the inventive idea.

In the drawings:

Figure 1 is a front elevational view of the carrier constructed in accordance with the principles of this invention.

Figure 2 is a top plan view of the carrier shown in Figure 1.

Figure 3 is a side elevational view of the carrier shown in Figure 1.

Figure 4 is a side elevational view of the carrier shown in Figure 1 when collapsed for shipping with the wheels removed.

Figure 5 is a sectional view along the line 5—5 of Figure 3, enlarged.

Figure 6 is a sectional view along the line 6—6 of Figure 3, also enlarged.

Figure 7 is a sectional view along the line 7—7 of Figure 3, likewise enlarged.

Referring now in greater retail to the drawings in which like reference numerals indicate like parts, reference numeral 10 indicates the collapsible container with open top, 11 the handle member, and 12 the wheels.

The collapsible container 10 is formed with the front frame 13 (Figs. 1 and 3), the opposed back frame 14 (Fig. 3) and the opposed end members 15 and 16 (Fig. 1). The front frame 13 is made with the upper horizontal member 17 (Fig. 1), the lower horizontal member 18, the left vertical member 19 and the right vertical member 20. The opposed back frame 14 is formed of similar horizontal and vertical members, and of course, the horizontal and vertical members may be integrally formed of any suitable material or joined by any suitable means. Lattice work is disposed along the surface portions of the horizontal and vertical members of the opposed frames 13 and 14. The lattice work consists of the spaced horizontal members 21 (Fig. 1) and the similarily spaced vertical members 22 with the ends of the horizontal members 21 protruding substantially beyond the vertical members 19 and 20 of the front frame 13 and the opposed back frame 14. Obviously, the lattice work could be in other form as long as some member thereof protrudes beyond the vertical members 19 and 20 of the opposed frames 13 and 14 for the purpose subsequently shown. Any suitable means may be used for attaching the members forming the lattice work to the opposed frames 13 and 14 and either on the outside or inside surface portions thereof.

The collapsible container 10 is further formed with the opposing end members 15 and 16 (Figs. 1 and 3) which consist of the spaced horizontal members 23 (Fig. 3) pivotally mounted to the protruding ends of the spaced horizontal members 21 of the front frame 13 and similarly spaced horizontal members on the opposed back frame 14, the ends of which protrude beyond the vertical members 19 and 20 of the front frame 13 and similar members of the opposed back frame 14. While any pivotal connecting means could be used, it has been found convenient to form co-acting holes in both ends of each of the horizontal members 23 and fitting the same over the aforesaid protruding ends of the members 21 on the opposed frames 13 and 14 which may be overturned after being passed rotatably through the co-acting holes to prevent the members from separating. To add strength to the structure the vertical members 24 of the opposed end members 15 and 16 are pivotally connected to the horizontal members 23 by any suitable means at points intermediate the ends thereof. As many of the vertical members 24 could be added as desired.

The collapsible container 10 is further formed with an open top and pivotally mounted base 25 (Fig. 2). The pivotally mounted base 25 is designed with the supports 26, 27, and 28 (Fig. 2) pivotally connected at one end to the lower horizontal member 18 of the front frame 13 and at the other end to a similar lower horizontal member of the opposed back frame 14. As shown in Figures 2 and 4, the pivotally attaching means may be attained by forming the ends of the supports 26, 27 and 28 rotatably around the said lower horizontal members. Lattice work comprising the spaced parallel members 29 (Fig. 2) over the top surface portions of the supports 26, 27, and 28 and attached thereto as desired completes the pivotally mounted base 25 although other types of lattice work could be equally well employed.

The handle member 11 is made with the spaced parallel vertical members 30 and 31 (Fig. 1) and the horizontal member 32 at the top integrally formed with the vertical members 30 and 31 or otherwise joined. The handle member 11 is attached along the back surface portion of the opposed back frame 14 as shown in Figures 1 and 3 by any suitable means with the bases of the vertical members 30 and 31 attached to the lower horizontal member of the opposed back frame 14.

The wheels 12 are rotatably mounted on the ends of the axle 33 (Figs. 1 and 5) by an mechanical means, the axle 33 being of sufficient length to extend substantially beyond the planes of the opposed end members 15 and 16 as shown in Figure 1.

The axle 33 is removable attached to the bottom surface portion of the pivotally mounted base 25 at the back in the following manner: On the inside of the pivotally mounted supports 26 and 28 (Fig. 2) are the members or flanges 34 and 35 in a plane substantially tangent to the bottom surface portions of the supports 26, 27, and 28. Through the members 34 and 35 are downwardly formed apertures. The tie rod 36 (Figs. 1 and 5) is attached to the members 34 and 35 by bolts and nuts or the like through the aforesaid apertures and co-acting apertures in the tie rod 36. The ends of the tie rod 36 are turned downwardly with aligned apertures formed therein and adapted for the insertion of the axle 33 prior to the attachment of the wheels 12. Obviously, other means could be used for removably attaching the wheels 12.

In order to support the collapsible container 10 upright when unattended, the downwardly extended support 37 (Figs. 1, 3, and 4) is attached to the front frame 13 at the base by any mechanical means, the support 37 being of sufficient height so that the pivotally mounted base 25 is substantially level when the collapsible container 10 is in the uncollapsed position and the opposite end of the base 25 supported by the wheels 12.

To prevent the collapsible container 10 from being collapsed accidentally or opened excessively, the latch 38 (Figs. 1, 3, 4, and 6) is pivotally connected to two spaced horizontal members 23 (Fig. 3) of the opposed end members 15 and 16. The latch 38 is formed of the pivotally mounted members 39 and 40 also pivoted at 41 (Figs. 3 and 6) while a sleeve 42 (Fig. 6) at the end of the member 39 is designed to co-act with the member 40 locking the container 10 in the desired open position when the members 39 and 40 are in straight angle position. While similar latches 38 have been shown in the illustrations on each of the opposed end members 15 and 16, the intended purpose should be accomplished with one latch and/or even with latches of different design and/or attachment.

The operation of the carrier is as follows, assuming the collapsible container 10 is in the collapsed position shown in Figure 4: The tie rod 36 is bolted or otherwise secured to the members 34 and 35 of the pivotally mounted base 25. The axle 33 is then passed through the aligned apertures in the turned down ends of the tie rod 36. The wheels 12 are then removably attached on the ends of the axle 33 on the outside of the turned down ends of the tie rod 36. Grasping the handle member 11, the front frame 13 of the collapsible container 10 is then pushed downwardly and the latch 38 placed in straight angle position. In the position thus described, the carrier may be wheeled as desired, placed upright and unattended by bringing the downwardly extended support 37 in contact with the floor or ground, the container filled with merchandise as desired and again wheeled where desired. When storing, the latch 38 is moved out of the straight angle position, the container 10 collapsed (Figure 4) by pulling upwardly on the front frame 13 in which position the carrier may be suspended from a wall or otherwise stored in a relatively small space. When shipping, the wheels 12, axle 33, and, if desired, the tie rod 36 may be removed in the manner previously shown and when so disassembled requires relatively small shipping space.

It is apparent that the specific illustrations shown have been given by way of illustration and not by way of limitation, and that the structures above described are subject to wide variation and modification without departing from the scope or intent of the present invention.

What is claimed is:

1. A carrier adapted to be wheeled to market comprising a collapsible container, wheeling means, and handle means; the collapsible container comprising at least one opposed front and back member, said opposed front and back members comprising at least one frame having at least two vertical and two horizontal members, means securing the horizontal and vertical members in opposed position, lattice work disposed on the frames with at least one member of the lattice work extending beyond the vertical members of the frames; the collapsible container further comprising opposed end members, said opposed end members comprising lattice work and adapted to be pivotally attached to the ends of the lattice work on the opposed front and back members extending beyond the vertical members of the frames; the collapsible container further comprising a base, the base comprising at least two spaced apart members pivotally disposed on the lower horizontal member of the opposed front and back members, at least one flange on the spaced apart members in a plane substantially tangent to the bottom surface portions thereof; the wheeling means comprising at least one tie rod having a substantially flat body portion with turned down ends, means securing the tie rod to the flanges with the turned down ends substantially aligned with the vertical members of the opposed front frame of the collapsible container, aligned apertures through the turned down ends of the tie rod, an axle through the aligned apertures and extending substantially on either side thereof, at least one wheel rotatably mounted at either end of the axle and substantially adjacent the outside surface portions of the turned down ends of the tie rod; the handle means comprising at least two spaced vertical members substantially longer than the height of the collapsible container, a horizontal member disposed between the vertical members at the top, and means attaching the handle member along the outside surface portion of the opposed back member substantially in the center thereof; and means locking the collapsible container in the uncollapsed position.

2. A carrier adapted to be wheeled to market according to claim 1 in which the carrier is characterized by means adapted to maintain the collapsible container upright on the wheels when the container is in the uncollapsible position and unattended.

3. A carrier adapted to be wheeled to market according to claim 1 in which the means locking the collapsible container in the uncollapsed position comprises a vertical member pivotally disposed on the horizontal member of at least one end member intermediate the ends thereof, and a latch pivotally and releasably disposed at an angle between the vertical member and one of the horizontal members.

JOSEPH SALAT.

REFERENCES CITED

The following references are of record in the file of this patent:

UNITED STATES PATENTS

| Number | Name | Date |
| --- | --- | --- |
| 1,414,535 | Valkenburg | May 2, 1922 |
| 2,363,619 | Prieto | Nov. 28, 1944 |
| 2,425,107 | Martin | Aug. 5, 1947 |